UNITED STATES PATENT OFFICE.

ARTHUR P. TAYLOR AND JAMES DONALD RUNYAN, OF CINCINNATI, OHIO, ASSIGNORS TO THE CHARLES TAYLOR SONS COMPANY, OF CINCINNATI, OHIO, A CORPORATION OF OHIO.

REFRACTORY PRODUCT AND METHOD OF MANUFACTURING THE SAME.

1,212,846.  Specification of Letters Patent. Patented Jan. 16, 1917.

No Drawing.  Application filed December 8, 1915. Serial No. 65,784.

*To all whom it may concern:*

Be it known that we, ARTHUR P. TAYLOR and JAMES DONALD RUNYAN, both citizens of the United States, residing at Cincinnati, in the county of Hamilton and State of Ohio, have invented a new and useful Improvement in Refractory Products and Methods of Manufacturing the Same, of which the following is a full, clear, and exact description.

Our invention has relation to a new refractory product, adapted for use in furnace work where a highly refractory material is desirable, and to a novel method of manufacturing the same, whereby a product of greatly superior character is obtained.

There is an increasing demand for a very highly refractory product in various arts. For instance, the development of automatic stokers has increased the demand for such a product in furnace work, owing to the higher temperatures generated. With the ordinary fireclay brick, these stokers can not be operated at their full rate, without excessive repairs to the brickwork. Indeed, in almost every field of industrial effort, the need for a high grade refractory material is such as to make it unnecessary to enumerate particular instances.

In the manufacture of the ordinary fireclay brick, a flint clay is employed for giving refractory qualities to the brick and a plastic fireclay is used for forming a bond between the particles of the flint clay, the two clays being mixed together in certain proportions. We have discovered that there are two main difficulties present in the manufacture of these bricks which prevent their possessing the necessary high refractory qualities. We have found that one of these difficulties is due to the fact that the flint clays as mined contain varying amounts of impurities, mainly iron salts, such as the ferric and ferrous oxids, and when these impurities are present in the bricks, the refractoriness is diminished, they are readily attacked by the slags, and are caused to deteriorate rapidly. Heretofore, in so far as we have been aware, there has been no satisfactory method of determining the presence and amount of these impurities in the raw clay. In one shipment of clay received by the brick manufacturer, the amount of salts present might be so small as not to seriously affect the quality of the brick produced, while in another lot, the impurities might be present to a very much greater extent and in injurious quantities. As a result, the bricks produced even from clays taken from the same mine or banks vary widely in their refractory qualities. These impurities occur largely in the form of pockets, and we have ascertained that if the flint clay is calcined before being used, the impurities when present result in such a discoloration of the calcined product as enables their presence to be readily detected. When so detected, they can be readily removed.

One feature of our invention, therefore, consists in the steps of calcining the raw flint clay and separating therefrom the impurities made visible by the calcining operation before mixing the clay with its bonding material or materials.

The second difficulty referred to has reference to the bonding material which has been used, viz., a plastic fireclay. This constitutes the greatest weakness of an ordinary fireclay brick, as the plastic clay not only vitrifies at comparatively low temperature, but in drying it causes the brick to shrink. This shrinkage will continue during the process of burning, and in most cases is not entirely taken out. As a result, if the brick in service is exposed to higher temperatures than it was in the kiln, there will be a still further shrinkage. Another objection to the plastic fireclay as a binder is that at high temperatures, the brick made from it are apt to grow plastic.

We have made extensive experiments for the purpose of discovering a satisfactory bonding material, and as a result of these investigations, we have found that a refractory product of greatly superior qualities may be produced by using kaolins as the bonding material, thus eliminating the use of the usual plastic fireclay. We have further discovered that the best results can be obtained by using a mixture of two different kaolins, one of a relatively highly plastic nature, to form a bond, and the other of a relatively high refractory character, to raise the vitrification temperature. For this purpose, we prefer to use a mixture consisting of eighteen parts by measure of the flint clay, preferably calcined as above described, five parts by measure of the koalin of relatively high refractory qualities, and three parts by measure of the kaolin of a relatively high plastic nature. These two different kaolins are found in nature, the more highly refractory kaolin being of a coarser grain than the other and being more in the nature of a crystalline product; whereas the other, more plastic kaolin, is not only of finer grain, but is more in the nature of an amorphous product. To this mixture of calcined flint clay and kaolins, sufficient water is added to give just sufficient cohesiveness to the mass to enable it to be shaped. Preferably, the amount of water is kept as low as possible. We may also add some temporary bonding material of a glutinous character, such as sugar or molasses, to hold the mass in shape, while placing it in the firing kilns, and which will burn out at the firing temperatures. The mixture is pressed in the molds, dried and then placed in the burning kiln, where it is subjected to a temperature of approximately 2400 degrees F., although much higher firing temperatures may be employed, if desired. In fact, one of the advantages of our invention is that it enables the refractory shapes to be fired at a temperature higher than the maximum temperature which the products will receive in service, but not destroy the essential physical properties of the brick.

The products resulting from our improved method are of an open-grained porous character, which are highly refractory and repellent to the action of slags and furnace gases. We attribute this repellent characteristic as due in part to the purity of the purified flint clay, by which its content of impurities is largely reduced, and in part to the nature of the bond employed, and in part to the porous coarse-grained character of the product. In service, we find that the combined effect of the slag or dust and the heat shows little effect on the brick, the discoloration or partial vitrification due to such effects being confined to the surface layer only, the main body of the brick being entirely unaffected. As a result, this brick does not burn away or spall off to the extent of the ordinary clay brick.

We do not desire to limit ourselves to the particular proportions above specified, since these may be widely varied. The effect, however, of increasing the proportion of the more highly refractory kaolin with respect to the more plastic kaolin is to increase the resistance to vitrification while weakening the bonding properties, and the effect of increasing the more plastic kaolin with respect to the more highly refractory form thereof is to reduce the resistance to vitrification. If the proportion of flint clay is reduced relatively to the proportion of the combined kaolins, the products will be somewhat stronger, but will be subjected to greater shrinkage in firing, while increasing the proportion of the flint clay relatively to the kaolins tends to make the product more crumbly. On account of the comparatively low shrinkage in firing, and its ability to stand firing at the maximum temperatures, there is little if any further shrinkage of the product in actual service, and at no time would it grow plastic. As a result, arches can be maintained by the use of this brick, which, on account of the expansion and plastic nature at high temperatures of the ordinary brick, would, if built with them, fall down. The small shrinkage is also an advantage in that it makes it easier to turn out shapes true to the drawing dimensions.

While we prefer to use flint clay as the body-forming material of the refractories, we may use any other material which is suitable for the purpose.

While we greatly prefer in all cases to calcine the raw flint clay before using it in the manufacture of our improved products, we do not, however, limit ourselves to this feature; and by the term "flint clay," as used in our broader claims, we intend to cover either the raw clay, the calcined clay, or a mixture of the two. That part of our invention which has reference to the calcining of the clay and separating out the impurities forms the subject matter of a divisional application, filed July 11, 1916, Serial No. 108,707.

We claim:

1. In the manufacture of refractory products, the method which comprises the steps of separating from flint clay the impurities contained therein, then mixing the purified clay with a kaolin bond, and then shaping and firing, substantially as described.

2. The herein described improvement in the manufacture of refractory products, comprising calcining clay, removing therefrom impurities made visible by the calcining operation, then mixing the calcined clay with a kaolin bond, shaping, and then firing, substantially as described.

3. The herein described method of manufacturing refractory products, comprising calcining clay, removing therefrom the impurities made visible by the calcining operation, mixing the calcined and purified clay with a bond consisting in part of a kaolin of relatively high refractory qualities and another kaolin of a relatively high plastic character, and then shaping and firing, substantially as described.

4. The herein described improvement in the manufacture of refractory products, comprising purifying flint clay to remove therefrom the impurities contained therein, mixing the purified clay with a bond consisting in part of a kaolin of relatively high refractory qualities and another kaolin of a relatively high plastic character, and then shaping and firing, substantially as described.

5. In the manufacture of refractory products, the method comprising mixing flint clay with a bonding material composed of two different kaolins of different refractory properties, substantially as described.

6. In the manufacture of refractory products, the method comprising mixing flint clay with a bonding material composed of two different kaolins of different refractory and bonding properties, substantially as described.

7. In the manufacture of refractory products, the improvement comprising mixing flint clay with a bonding material, consisting of a kaolin of relatively high refractory nature, and another kaolin of a lower refractory nature, but of greater bonding properties, substantially as described.

8. In the manufacture of refractory products, the improvement comprising mixing clay with a bonding material, consisting of a kaolin of relatively high refractory nature, and another kaolin of a lower refractory nature, but of greater bonding properties, the first named kaolin being in an amount in excess of the last named kaolin, substantially as described.

9. As a new article of manufacture, a refractory product, comprising flint clay and kaolin, substantially as described.

10. As a new article of manufacture, a refractory product comprising calcined flint clay and kaolin, substantially as described.

11. As a new article of manufacture, a refractory product, comprising clay and a binder composed of two different kaolins having different vitrification points, substantially as described.

12. As a new article of manufacture, a refractory product, comprising calcined flint clay and a binder composed of two different kaolins having different vitrification points, substantially as described.

13. As a new article of manufacture, a refractory product comprising clay and a binder composed of a kaolin of relatively high refractory properties, and another kaolin of relatively low refractory properties and of a more plastic character, substantially as described.

14. As a new article of manufacture, a refractory product comprising clay and a binder composed of a kaolin of relatively high refractory properties, and another kaolin of relatively low refractory properties and of a more plastic character, the first named kaolin being in an amount in excess of the last named kaolin, substantially as described.

In testimony whereof, we have hereunto set our hands.

ARTHUR P. TAYLOR.
JAMES DONALD RUNYAN.

Witnesses:
MALCOLM McHOOY,
CLARENCE WESTERKAMP.